July 20, 1943.  C. W. GRONCY  2,324,991
MOLDING APPARATUS
Filed March 7, 1941   4 Sheets-Sheet 3
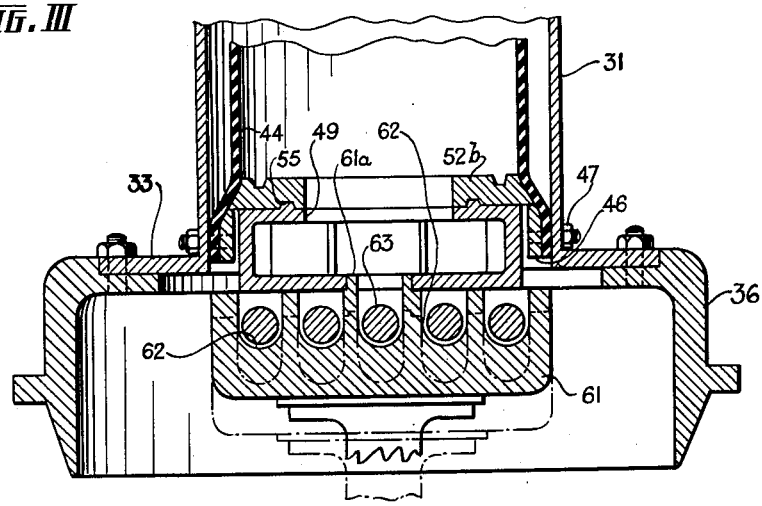
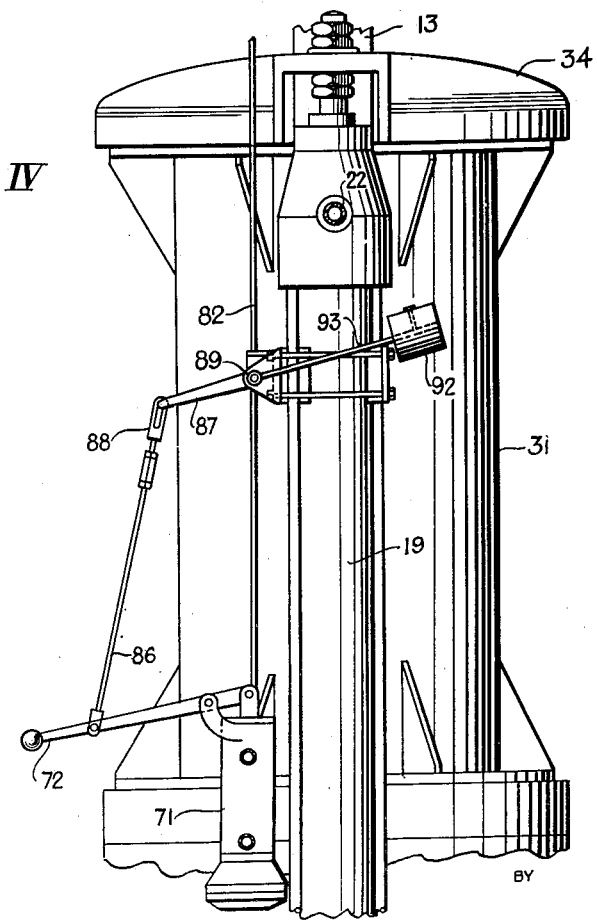
INVENTOR
CARL W. CRONCY
AND
EDWARD HECK
BY
ATTORNEYS July 20, 1943.  C. W. GRONCY  2,324,991
MOLDING APPARATUS
Filed March 7, 1941  4 Sheets-Sheet 4
FIG. V
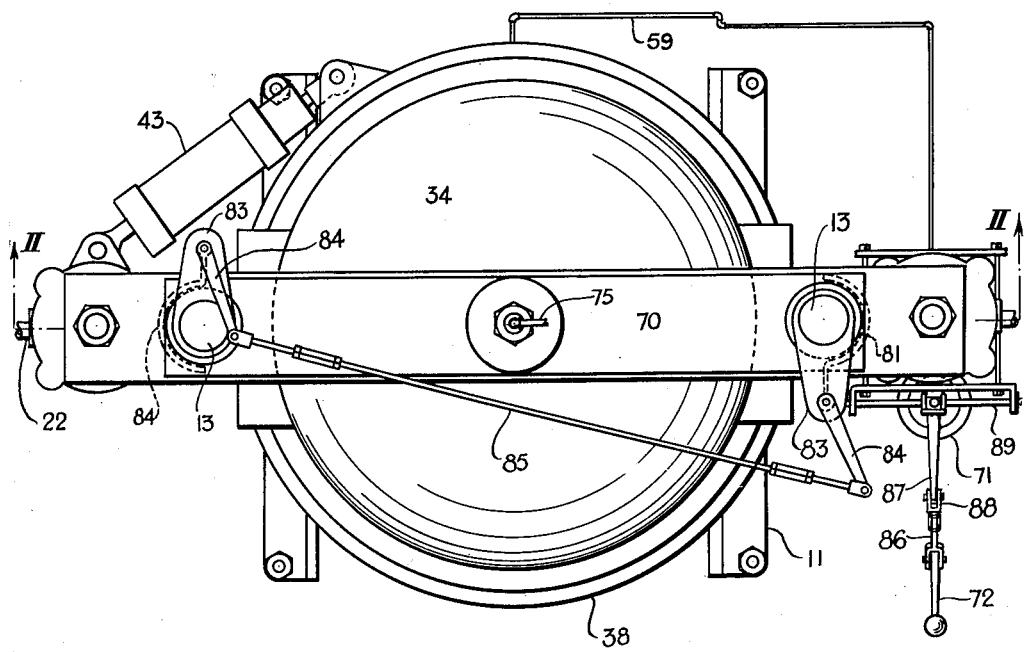
FIG. VI
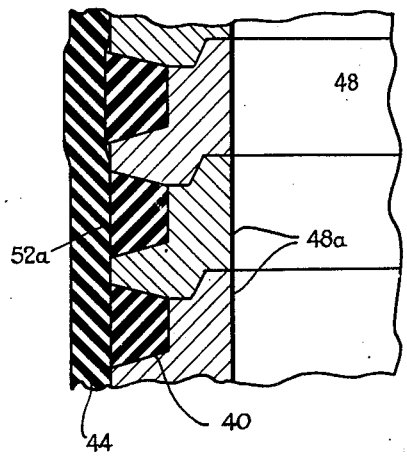
INVENTOR
CARL W. GRONCY
AND
EDWARD HECK
BY
ATTORNEYS Patented July 20, 1943

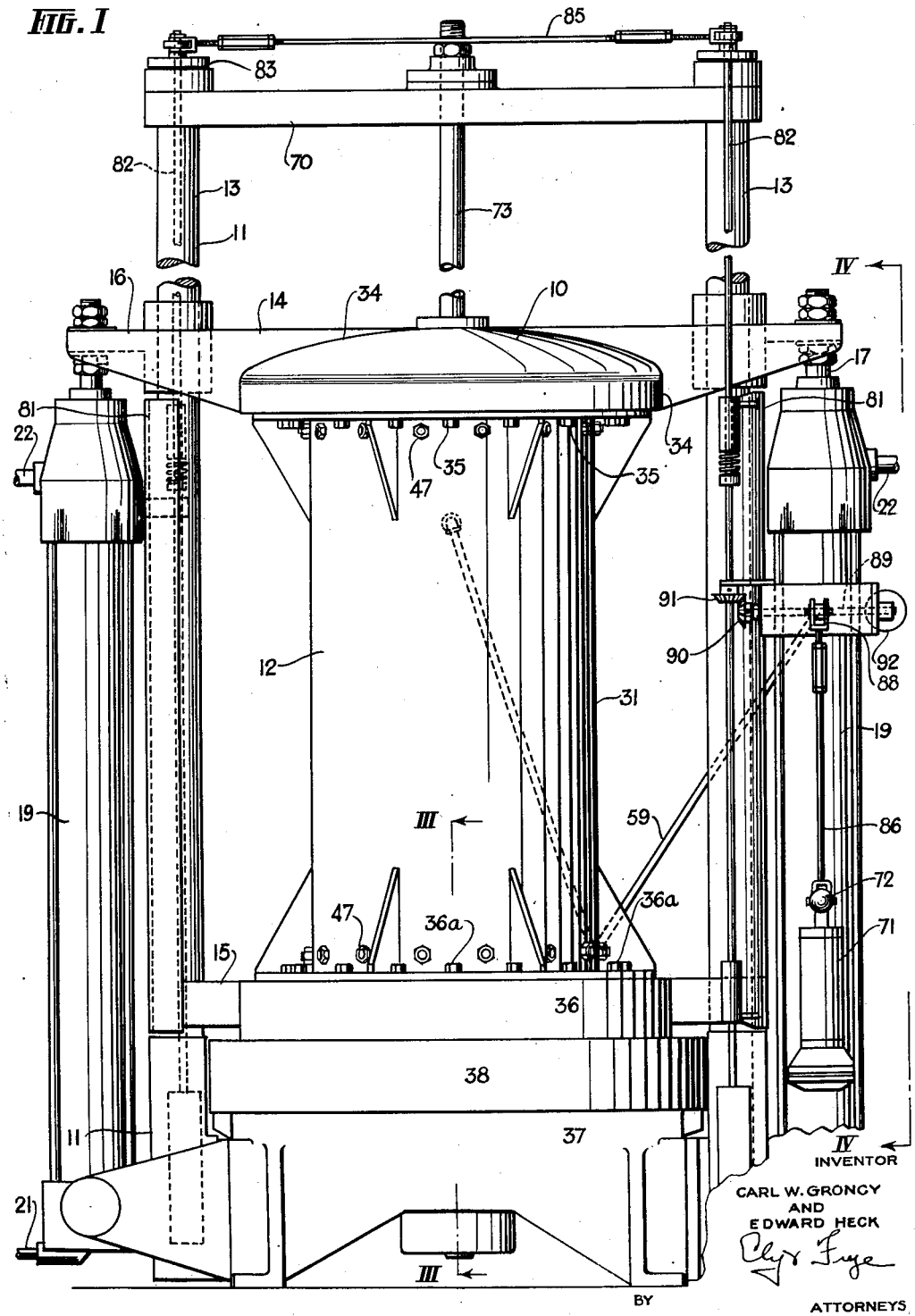

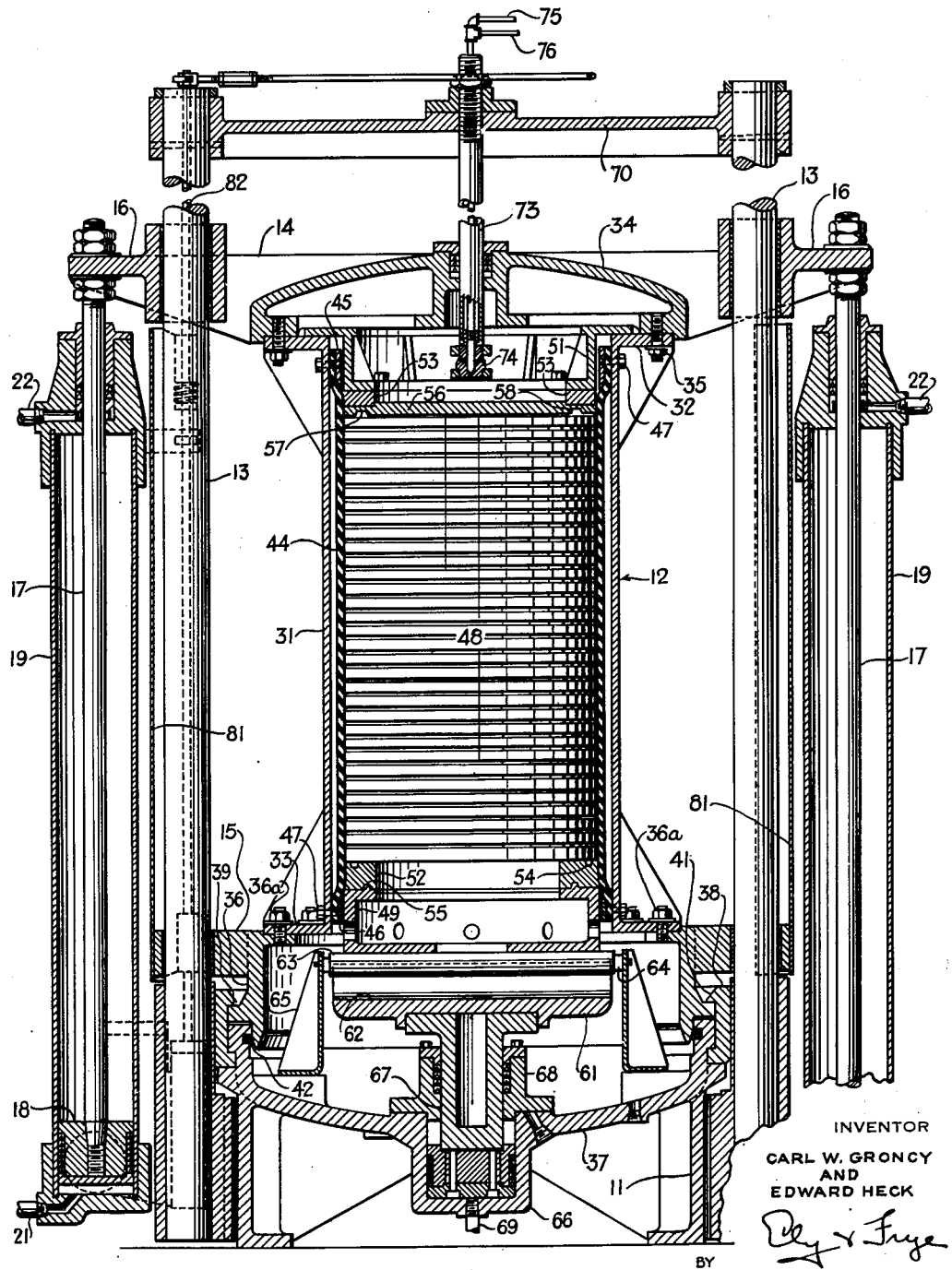

2,324,991

UNITED STATES PATENT OFFICE 2,324,991

MOLDING APPARATUS

Carl W. Groncy and Edward Heck, Akron, Ohio, assignors to The Firestone Tire & Rubber Company, Akron, Ohio, a corporation of Ohio Application March 7, 1941, Serial No. 382,198

11 Claims. (Cl. 18—17)

The present invention relates generally to molding apparatus for thermosetting and thermoplastic materials, more especially to apparatus for vulcanizing a plurality of annular rubber articles held in molds wherein portions of the outer surfaces of the articles are exposed.

The present invention will be described particularly with reference to fan belts, although other rubber articles which are vulcanized in molds that expose a portion of the outer surface of the article may be vulcanized by the apparatus of the invention.

Heretofore fan belts have usually been vulcanized by placing them in a segmented cylindrical mold that confines the base and side portions of the fan belts, whereas the outer portions of the belts are exposed. These outer surfaces of the fan belts then are confined, and the fan belts forced into the mold, by a spiraled wrapping tape placed around the outer surface of the cylindrical mold. The above operation is both tedious and expensive, as well as not being entirely satisfactory in that the tapes loosen as the rubber flows into the mold whereby the rubber is not continuously forced into the mold and does not fill same completely.

The general object of this invention is to provide an improved apparatus for vulcanizing fan belts and to provide apparatus of the character mentioned which insures the production of perfectly shaped articles.

A further object of the invention is to provide sturdy, inexpensive apparatus which is adapted to vulcanize a plurality of fan belts rapidly and inexpensively; to center the articles in the vulcanizer; and to handle a variety of sizes of articles.

A further object is to provide vulcanization apparatus which can be positively positioned in a safe inoperative position.

The above and further objects will be manifest as the specification proceeds.

In the accompanying drawings:

Figure I is an elevation of the apparatus embodying the invention;

Figur II is a vertical section on line II—II of Figure V;

Figure III is an enlarged detail section on line III—III of Figure I with a modified adapter ring substituted for that shown in Figure II;

Figure IV is a side elevation, partly broken away, of the apparatus of Figure I with the handle 72 pulled down;

Figure V is a plan of the apparatus shown in Figure I; and

Figure VI is a section on a larger scale of a portion of the segmented fan belt mold.

Referring specifically to the drawings, a fan belt vulcanizing apparatus generally indicated by the numeral 10 is shown, which apparatus broadly comprises a frame 11 upon which a vulcanizer head 12 is slidably carried. The frame 11 includes two spaced, vertically positioned cylindrical supports 13, on which upper and lower supporting arms or yokes 14 and 15, respectively, are slidably carried, which arms engage with and support the vulcanizer head 12. The supporting arm 14 includes laterally outwardly extending flanges 16 at the ends thereof, which flanges engage with piston rods 17 that extend downwardly therefrom. The piston rods 17 have heads 18 thereon which are received in cylinders 19, positioned adjacent and extending vertically with relation to the vulcanizer head 12. Suitable pipes 21 and 22 connect to the extremities of the cylinders 19 for introducing fluid into or exhausting it from the cylinders 19 so that the vertical positions of the piston heads in the chamber can readily be controlled. The pipes 21 and 22 connect to a suitable source of hydraulic fluid (not shown) whereby sufficient pressure can be exerted upon the piston heads 18 to raise or lower the piston rods 17 and their associated mechanism relatively of the remainder of the cylinders 19. As the supporting arm 14, which is associated with the vulcanizer head 12, engages with the piston rods 17, it is seen that the vertical position of the vulcanizer head with relation to the supports 13 can readily be controlled by operation of the cylinders 19.

Figure II shows that the vulcanizer head 12 mainly comprises a cylindrical sleeve 31 which has outwardly extending flanges 32 and 33 integrally formed at the upper and lower ends thereof, respectively. The arm 14 has a disc shaped head portion 34 formed integrally therewith and studs 35 secure the upper flange 32 of the sleeve 31 thereto whereby the upper end of the sleeve is sealed. The lower flange 33 is engaged with the upper end of a cylindrical reinforcing and positioning ring 36 formed integrally with the lower supporting arm 15 by bolts 36a. The ring 36 engages with a base, or head 37, which is stationarily mounted on the frame 11, through a locking ring 38 whereby the members 31, 34, 36, and 38 combine to form an air-tight compartment in the vulcanization apparatus. Circumferentially spaced, outwardly extending lugs 39 are provided on the lower portion of the ring 36 and the lugs engage with similarly positioned lugs 41 formed on the ring 38 to secure, removably, the rings together. A suitable gasket 42 is provided between the rings 36 and 38 to seal the joint therebetween. A piston 43 is connected between the frame 11 and the locking ring 38, which piston, when motivated by suitable control and operation means (not shown), moves the locking ring through a small arc to lock or unlock the lugs 39 and 41. When the locking ring is disengaged, the unit formed by the head 34, sleeve 31, and ring 36 can be moved upwardly on the supports 13 by the cylinders 19.

To provide a flexible member for forcing the articles into the molds with which they are associated, a rubber sleeve 44 is mounted in the bore of the sleeve 31 by segmented rings 45 and 46 which compress the end portions of the rubber sleeve against the sleeve 31. Stud bolts 47 secure the rings 45 and 46 in place. It will be seen that the rubber sleeve 44 is appreciably longer than a segmented fan belt mold 48 which is shown in Figure II of the drawings and, usually, the normal diameter of the rubber sleeve should about equal the mold diameter. The fan belt mold 48 has a bottom spacer 49 and an upper spacer 51 provided therefor, the latter being fixedly mounted between the head 34 and the sleeve flange 32, and extending into said sleeve interiorly of the rubber sleeve 44. The metal sleeve 31 is enabled to receive several different diameter articles therein by adapter rings 52 and 53 which engage with, respectively, the bottom spacer and upper spacer 49 and 51. The adapter ring 52 has annular recesses in its top and bottom surfaces for engaging with lugs 54 and 55 formed on the lower mold section and the bottom spacer 49, respectively to center the mold on the latter. Adapter ring 53 is secured to the upper spacer 51 and engages with a guide ring 56 which has an annular recess 57 therein in which a lug 58 of the upper mold segment is received. Note that the diameter of the adapter rings adjacent the mold 48 may vary from its diameter adjacent the mold head, as shown by the modified adapter ring 52b shown in Figure III, but that the periphery of the adapter rings smoothly combines with that of the mold. Therefore, by changing the adapter and guide rings any articles having diameters equal to or slightly smaller than the diameter of the spacers 49 and 51 can be received in the apparatus. If the article to be processed is much smaller than the shell 31 (and spacers 49 and 51) then a smaller shell and smaller spacers should be substituted for those shown herein. Figure VI shows that fan belts 52a are received in the mold 48 and that the outer surfaces of the fan belts are exposed, whereas the remaining surfaces thereof are confined in the cavities of the mold formed between the individual segments 48a of the mold.

During vulcanization of fan belts 52a, the rubber sleeve 44 must be forced radially inwardly so that it forces the fan belts into their mold cavities. To this end a jointed pipe 59 connects to the space between the sleeves 31 and 44. A suitable source of fluid pressure, such as glycerin, is connected to the free end of the pipe 59 whereby the rubber sleeve can be pressed tightly against the fan belts.

The assembled fan belt molds are carried on, and centered by, a ram head 61 which has a plurality of parallel recesses 62 formed therein (Figure III). These recesses are designed to receive rollers 63 of a conveyor 64 that is positioned in the lower part of the vulcanizer 10 by means of brackets 65 and on which the fan belt mold 48 normally is positioned. Lugs 61a are formed on the ram head 61 to engage with corresponding holes formed in the base head 49 and center the mold 48 in the apparatus. The ram head 61 is mounted for limited vertical movement by means of a cylinder 66 formed in the base 37 into which a ram 67 supporting the ram head 61 extends. The ram 67 is sealed in the cylinder 66 by a sealing collar 68. By raising or lowering the ram head 61, the mold 48 is lifted from or deposited upon the conveyor 64. The ram also is utilized to elevate the mold, after the vulcanizer head 12 is locked in its lower or operating position, whereby the mold is forced against the upper spacer 51 to compact the mold segments and hold them so during the vulcanizing operation. A pipe 69 connects to the cylinder 66 and to a source of hydraulic pressure so that a fluid can be forced into or out of the cylinder to raise or lower the ram 67.

The fan belt mold 48 can be placed on the conveyor 64 in any desired manner when the vulcanizer head is in its uppermost position. A suitable conveyor (not shown) may be placed adjacent the apparatus 10 and be provided with a removable or hinged section to bridge the space between the conveyors and enable the mold 48 to be placed in or taken from the apparatus.

Steam for vulcanizing the fan belts may be introduced into the base of the vulcanization head through suitable means connected to the base head 37 thereof. This steam flows upwardly of the vulcanization apparatus around the conveyor 64, mold spacer 49, and into the interior of the mold 48. The steam may exhaust through the upper head of the vulcanizer, or it may merely be confined in the vulcanizer. Steam supplied solely to the inner surface of the fan belt mold will readily vulcanize fan belts held therein. Of course, steam is not introduced into the apparatus 10 until the vulcanizer head 12 is locked to the base 37 and the rubber sleeve 44 is forced against the mold 48.

After the vulcanization of the fan belts has been completed, the rubber sleeve 44 is freed from the fan belt mold 48. Usually this is done by applying a vacuum to the outer surface of the rubber sleeve, which action is effected by withdrawing (positively, if necessary) the fluid forced thereagainst and which draws the rubber sleeve tightly against the inner surface of the sleeve 31 to facilitate movement of the vulcanizer head 12 with relation to the fan belt mold. To remove the fan belts from the apparatus, the ram head 61 is lowered, the vulcanizer head is raised, and the fan belt molds are slid from the apparatus by rolling them over the conveyor 64, after which the individual fan belts may be freed from the mold by knocking the segments thereof apart. A control valve 71 is provided for the cylinders 19 and a handle 72 is provided to operate the valve 71 whereby the operation of the cylinders 19 and the position of the vulcanizer head 12 are readily controlled. The handle 72 is shown in its raised position in Figure I before the vulcanizer unit is moved to its upper position on the supports 13 while it is shown in its lower position in Figure IV.

A feature of the apparatus is that a pipe 73 carrying a spray head 74 is fixedly mounted on an upper cross arm 70 of the frame and extends downwardly therefrom. This pipe 73 and spray head 74 extend through the upper head 34 of the vulcanizer. Upon upward or downward movement of the vulcanizer head, the spray head 74 may be used to spray protective fluids, such as glycerin, upon the inner surface of the rubber sleeve 44 which obviously is subjected to severe temperatures and pressures during vulcanization of the fan belts. To this end feed pipes 75 and 76 connect to the spray head to supply air and fluid thereto. The spray head also functions as a knockout element to prevent fan belts, or molds, from moving upwardly with the vulcanizer head. The pipe 73 is fixedly positioned, and bears upon the guide plate 56 immediatley upon upward movement thereof to knock out or hold back any articles or mold segments stuck to the rubber sleeve 44.

A safety feature of the apparatus is that means, such as arcuate metal plates 81, for extending between the lower end of the member 36 and the frame 11 when the vulcanizer head 12 is raised, are provided to prevent untimely downward movement of the vulcanization head. The plates 81 are secured to vertically extending rods 82 which are pivotally mounted on the frame 11 adjacent to, but on opposite sides of the posts 13. The rods extend the height of the apparatus 10 and protrude through brackets 83 extending from opposite sides of the upper supporting arm 70. Levers 84 are secured to the upper ends of the rods 82 and extend in the same direction therefrom. A tie bar 85 connects the rods 82 together, whereby they can only be rotated as a unit. The positioning of the safety plates 81 is controlled by the handle 72 which engages with a link 86 that connects to a lever 87 through a lost motion connection 88 whereby lost motion between the link 86 and lever 87 may occur. A shaft 89 is journaled on the cylinder 19 adjacent the valve 72 and it has a bevelled gear 90 on an ned thereof adjacent one of the rods. A second bevelled gear 91 is carried on the adjacent rod 82 and meshes with the gear 90 while the lever 87 is secured to the shaft 89 so that a connection is formed between the handle 72 and the safety plates 81. When the vulcanizer head is to be raised, the handle 72 is lifted which causes the cylinders 19 to raise the vulcanizer head. The link 86 is moved upwardly by the handle 72 and the end of the lever 87 is moved to the lower end of the connection 88, which frees the shaft 89 for rotation. The rods 82 are rotated and the safety plates are urged into position by a weight 92 which is secured to the shaft 89 by a rod 93 which extends substantially horizontally therefrom, when the vulcanizer head is in its lowermost position, as shown. This action results from the continued and automatic rotational movement acting on the shaft 89 and through gears 90 and 91, levers 84 and tie bar 85 to both rods 82. When the vulcanizer head is to be lowered, the handle 72 is moved downwardly and the connection 88 then transmits movement to the shaft 89 to rotate the rods 82 and move the safety plates to an unlocking position. The weight 92 is moved upwards by such rotation of shaft 89. Note that the safety plates cannot move into locking position until the vulcanizer head is raised whereby a continued force must be exerted thereon, which action is provided by the weight 92.

Figure VI shows that the individual segments 48a of the mold 48 have corresponding recesses and lugs formed on similar sides thereof whereby the segments of the mold properly align themselves and form cavities in which the fan belts 52a are positioned. Note that the rubber sleeve 44 forces the fan belts individually into the mold and retains a compressive force thereon regardless of the change in shape of the belts.

In operation it is seen that the apparatus of the invention provides ready means by which vulcanization apparatus may be brought into and removed from association with a stack of fan belts placed in a multiple cavity fan belt mold with their outer surfaces exposed, in accordance with usual practice. After the vulcanization head 12 is brought in proper relation to the fan belt mold, then the rubber sleeve can be compressed against the fan belts to retain them in their mold cavities, which pressure is constantly and uniformly exerted on the fan belts during their entire vulcanization period, regardless of changes in shape of the fan belts. Upon completion of vulcanization, the fan belts are readily removed from the vulcanizer by merely evacuating the chamber between the rubber sleeve 44 and the sleeve 31, after which the vulcanization head can be telescoped from engagement with the fan belts.

The detailed description of the particular embodiment of the invention illustrated and described herein is not to be construed as limiting the invention thereto. The invention includes all features of patentable novelty residing in the foregoing description and the accompanying drawings.

What is claimed is:

1. Vulcanization apparatus for annular rubber articles having a portion of their outer peripheries exposed when placed in the molds therefor, said apparatus comprising a segmental mold for annular rubber articles adapted to position same with a portion of their outer peripheries exposed, a reciprocable ram upon which said mold is positionable, a rigid casing adapted to be positioned around and radially spaced from said mold, a flexible sleeve mounted within said casing with the ends in fluid sealing engagement with the casing walls for telescoping movement to and from a mold enclosing position, and means for forcing said flexible sleeve inwardly into tight engagement with said mold when the latter is inside said casing whereby annular rubber articles in said mold can be forced tightly thereinto.

2. Apparatus of the class described comprising a mold adapted to receive an annular article and expose a portion of the outer surface thereof, a substantially rigid sleeve positionable around and spaced from said mold, a flexible sleeve positioned between said mold and said cylindrical sleeve and secured to said cylindrical sleeve at axially spaced circumferential portions thereof, means for setting up pressure between said cylindrical sleeve and said flexible sleeve to force said flexible sleeve against said mold and any article placed therein, a frame, a reciprocable ram supporting said mold in axial alignment with said sleeves, means mounting said substantially rigid cylindrical sleeve upon said frame for telescoping movement from a mold enclosing to a mold exposing position, and means for locking said cylindrical sleeve in each position.

3. Vulcanization apparatus for annular rubber articles comprising fixed vertically extending spaced supports, a yoke slidably associated with said supports, a sleeve-like member carried by said yoke for vertical movement on said supports, a vertically reciprocable ram adapted to raise and lower a mold positioned between said spaced supports and coaxially of said sleeve-like member, a piston secured to said yoke, a vertically extending cylinder positioned adjacent said supports and receiving said piston, connector means for controlling the vertical position of said sleeve-like member in accordance with piston movement whereby said sleeve-like member can be reciprocated to and from a mold enclosing position, a flexible sleeve carried interiorly of said sleeve-like member and exteriorly of the mold therein, and means for contracting the flexible sleeve to engage articles disposed in the mold.

4. A device as set forth in claim 3, including conveyor means for supporting the mold for said rubber articles positioned between said spaced supports, wherein the ram is positioned below said conveyor means and adapted to lift the mold off said conveyor means to a position thereabove within the sleeve-like member.

5. Vulcanization apparatus as in claim 3 wherein a spray head is fixedly mounted on said supports and it is adapted to extend into said flexible sleeve when same is out of telescoped relation with said mold whereby protective liquids can be applied to said flexible sleeve.

6. Apparatus of the class described comprising a vertically positioned frame, an inverted cup-like head slidably mounted on said frame, means on said frame for supporting a mold, means associated with said frame for forming a chamber with said cup-like head, said mold supporting means being within said chamber, means for moving said cup-like head into and out of encompassing relation with said mold supporting means, safety plates for locking said cup-like head out of encompassing relation with said mold positioning means, and means for urging said safety plates into locking relation with said cup-like head continually as said cup-like head is moved from its encompassing to its non-encompassing position.

7. Apparatus as in claim 6, wherein said cup-like head comprises a removable sleeve, and a rubber sleeve secured to said removable sleeve at the ends thereof, and including adapter rings removably associated with the adjacent head surfaces of said cup-like head and said mold supporting means, said adapter rings being adapted to engage with molds of varying sizes positioned in the apparatus whereby said sleeves and adapter rings can be changed to adapt the apparatus to handle molds of different diameters.

8. Vulcanization apparatus for annular rubber articles having a portion of their outer peripheries exposed when placed in the molds therefor, said apparatus comprising a mold providing a plurality of superposed annular outwardly open channels adapted to receive uncured annular rubber articles, the outer surfaces of said articles being exposed, a casing operable through a vertical path from a position wherein said mold and the articles disposed therein are exposed, to a position wherein said mold and articles are enclosed by the walls of said casing in spaced relation to the mold and articles, a flexible sleeve disposed interiorly of the casing with opposite end margins in fluid sealing engagement therewith, fluid operable means associating with said flexible sleeve to maintain the sleeve disengaged from the casing during movement thereof between said positions, and to maintain said sleeve in pressure engagement with outer portions of said articles to maintain said articles pressed against the inner walls of the annular mold grooves during vulcanization, and fluid pressure operated means for exerting axially directed pressure on said mold when the casing is locked in mold-enclosing position.

9. Vulcanization apparatus comprising an upright segmental mold for rubber articles adapted to position articles with a portion of their outer peripheries exposed, an inverted cup-like casing adapted to be moved into a position to confine the mold in radially spaced relation thereto, a flexible sleeve mounted within the casing in a position to enclose the mold, means mounting said casing for telescoping to and from a mold enclosing position, means for raising and lowering the casing, said means having associated therewith safety means for releasably locking said casing at its upper extremity of movement relative to said mold, a vertically reciprocable ram upon which the mold is positionable adapted to lift the mold relatively of the casing into engagement with the top of the latter, and fluid means for forcing said flexible sleeve inwardly into tight engagement with said mold and articles when the casing is in a mold enclosing position for the positive retention of said articles within the mold during a vulcanization operation.

10. In a device of the character described, a fixed base frame having a pair of upstanding slide bars, a mold receiving conveyor mounted on the frame intermediate the slide bars, a vertically movable ram adapted to telescope through said conveyor to lift molds from the conveyor to a position thereabove, a downwardly open housing disposed above the conveyor and between said bars in slidable relation thereto, means for actuating said housing from a mold enclosing to a mold exposing position, said actuating means being controllable through a pivoted lever, a locking member mounted for oscillation about one of said slide bars when the housing is in a mold exposing position to prevent accidental descent of the housing, and means connecting said hand lever and said locking member whereby said member is oscillated into locking position at the end of the housing raising operation and is oscillated to a position of release at the start of a housing lowering operation, whereby an operator is protected against the accidental lowering of the housing during installation or removal of a mold therefrom.

11. In a device of the character described, a fixed base frame having a pair of upstanding slide bars, a mold receiving conveyor mounted on the frame intermediate the slide bars, a vertically movable ram adapted to telescope through said conveyor to lift molds from the conveyor to a position thereabove, a downwardly open housing disposed above the conveyor and between said bars in slidable relation thereto, upper and lower yokes slidably associated with the bars and extending therebetween, said housing being carried by said yokes intermediate the same, means for actuating said housing from a mold enclosing to a mold exposing position, and means for locking said lower yoke to the base frame when the housing is in operative position, said locking means comprising a retention ring having portions adapted to engage the yoke and base respectively when the ring is in locking position, said portions being disengageable by rotation of the ring.

CARL W. GRONCY.
EDWARD HECK.

CERTIFICATE OF CORRECTION.

Patent No. 2,324,991.  July 20, 1943.

CARL W. GRONCY, ET AL.

It is hereby certified that error appears in the printed specification of the above numbered patent requiring correction as follows: Page 1, first column, line 46, for "Figur" read --Figure--; page 3, first column, line 40, for "ned" read --end--; and second column, line 44, claim 1, after "walls" insert --,means mounting said casing--; page 4, first column, line 15, claim 4, before "wherein" insert --and--; and that the said Letters Patent should be read with this correction therein that the same may conform to the record of the case in the Patent Office.

Signed and sealed this 21st day of September, A. D. 1943.

(Seal)

Henry Van Arsdale,
Acting Commissioner of Patents.